Dec. 21, 1965 S. DIX 3,224,308
LOADING MACHINE
Filed Oct. 18, 1963 2 Sheets-Sheet 2

INVENTOR:
Sydney Dix
Attorneys united States Patent Office 3,224,308
Patented Dec. 21, 1965

3,224,308
LOADING MACHINE
Sydney Dix, Costa Mesa, Calif., assignor to Dix Engineering Co., Venice, Calif., a corporation of California
Filed Oct. 18, 1963, Ser. No. 317,255
10 Claims. (Cl. 83—133)

The present invention relates to loading means and more particularly to loading means for successively loading a series of substantially identical parts on a series of substantially identical workpieces.

In certain industrial processes, it is necessary to assemble a series of substantially identical parts with a series of workpieces whereby a finished product may be produced. In a modern and efficient process, the assembling of the various parts is accomplished automatically by means of a machine that may operate at a high rate of speed with a minimum amount of manual labor. In spite of the desirable advantages of lower labor costs and higher production rates in some types of operations it has been impossible to automate the various steps in the assembly process. As a consequence, in such processes it has been necessary to carry out the various steps by hand.

By way of example, in the manufacture of glass encapsulated diodes, a glass capsule having an electrical lead fused in one end is initially provided. A portion of this lead extends a short distance into the capsule while the outer portion of the conductor extends a considerable distance from the capsule and forms an electrical lead for interconnecting the diode with a suitable component. In order to complete the assembly of the diode it is necessary to place a semiconductor wafer in the capsule and solder the wafer to the short inner end of the conductor. Heretofore, in order to accomplish this, a large group of the empty glass capsules have been placed upon a solder boat, so that all of the capsules will be positioned with their open ends directed upwardly. A piece of solder has then been manually inserted into each of the individual capsules. The solder has been a preformed pellet or a so-called solder preform that has been previously obtained from a supplier thereof. The high cost of the preforms and the manual placing of them in the capsules has contributed in substantial measure to the high cost of the finished diodes.

Following the positioning of the solder preform, a semi-conductive wafer is next manually inserted into each of the individual capsules. As a result of the inefficient and time-consuming nature of this manual assembly technique, numerous attempts have been made to provide a machine capable of automatically loading the various elements such as the so-called solder preforms into the glass capsules. However, in spite of the obvious advantages and financial rewards, the numerous prior attempts have been unable to provide a satisfactory loading machine. As a consequence, heretofore it has been necessary to load all of the various pieces such as solder preforms into the capsules one at a time by hand.

It is now proposed to provide means which will overcome the foregoing difficulties. More particularly, it is proposed to provide loading machine that will drastically reduce if not entirely eliminate the amount of manual labor required in the assembly of glass encapsulated diodes. It is further proposed to provide a loading machine that eliminates the necessity of procuring the expensive preform pellets of solder or so-called solder preforms. This is to be accomplished by providing a loading machine that is adapted to receive a workpiece holder carrying a large number of glass capsules and is effective to simultaneously produce a solder preform for each of the capsules in the group and to load the resultant solder preforms into the glass capsules whereby the glass capsules may be automatically loaded at a high rate of speed with little or no manual labor. In addition, it is proposed to provide an automatic loading machine of the foregoing nature which is not only inexpensive to manufacture and use, but is also very simple to operate and is reliable in operation.

These and other features and advantages of the present invention will become readily apparent from the following detailed description of one operative embodiment of the present invention, particularly when taken into connection with the accompanying drawings, wherein like reference numerals refer to like parts, and wherein.

Figure 1:
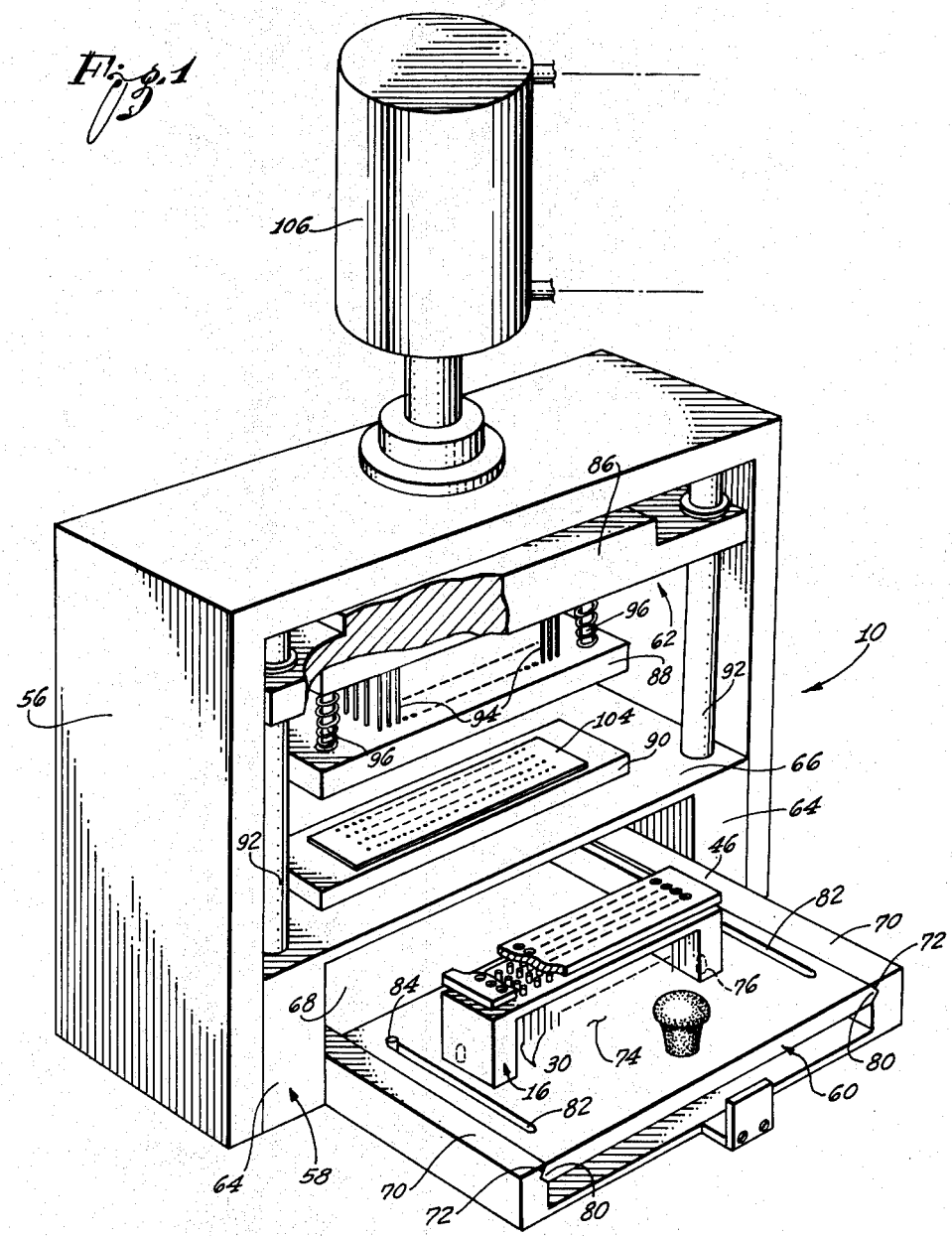
FIGURE 1 is a perspective view of a loading machine embodying one operative form of the present invention.
Figure 2:
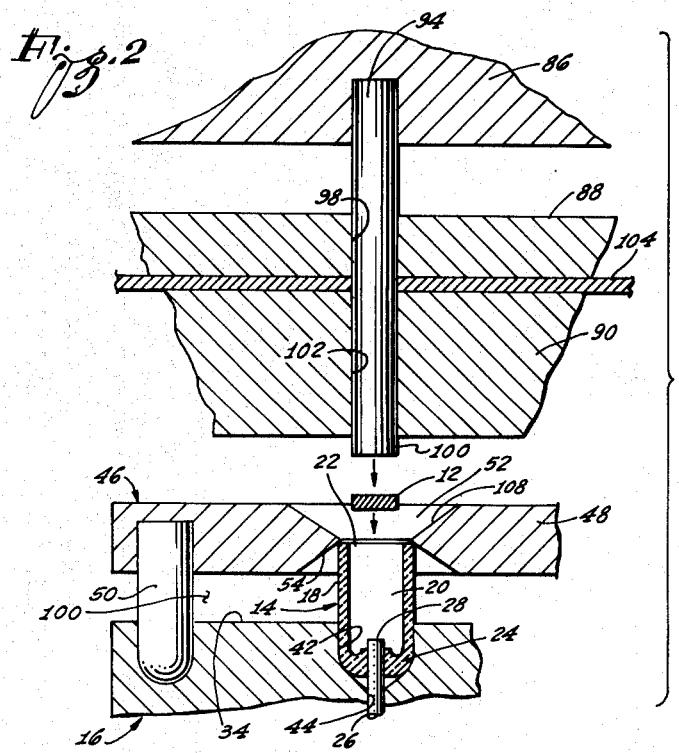
FIGURE 2 is a fragmentary cross-sectional view of a portion of the machine of FIGURE 1.
Figure 3:
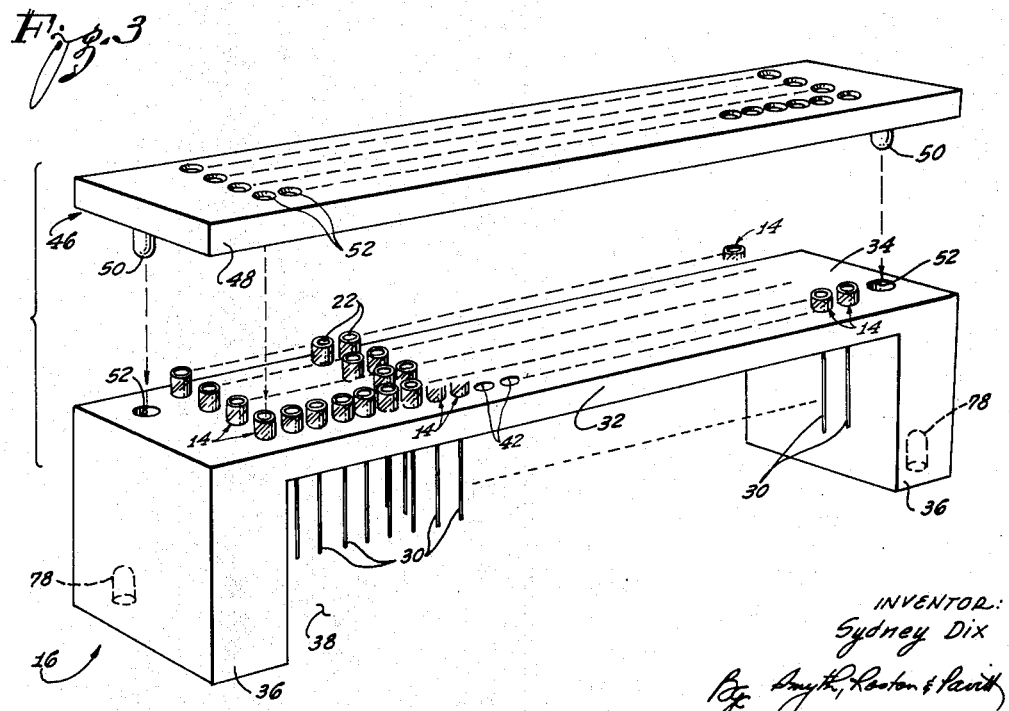
FIGURE 3 is a perspective view of a workpiece holder suitable for being employed in the loading machine of FIGURE 1.

Referring to the drawings in more detail, the present invention is particularly adapted to be embodied in a machine 10 for loading a series of substantially identical parts into a series of substantially identical workpieces. This machine 10 may be adapted for loading of pieces of a wide variety of sizes and kinds onto a wide variety of sizes and kinds of workpieces. However, in the present instance the machine 10 is particularly adapted for loading a small piece of solder or a so-called solder preform 12 into a glass capsule 14 such as used in the manufacture of glass encapsulated diodes.

Normally, in the manufacture of glass encapsulated diodes initially a large number of empty glass capsules 14 are mounted on a suitable workpiece holder such as a so-called solder boat 16. The glass capsules 14 are of a substantially standard design and are readily available in the industry. Normally, the glass capsules 14 are received from the manufacturer of the glass capsules 14 in bulk form. Each capsule 14 includes a small section of glass tubing 18 having passages 20 that extend axially of the tube 18.

One end 22 of this tube 18 is open so as to permit ready access into the interior 20 of the tube 18. The opposite end 24 of the capsule is fused around an electrical lead or conductor 26 to form a hermetic seal. The inner end 28 of the conductor extends a small distance into the interior 20 of the capsule 14. The remaining portion of the conductor extends from the outside of the capsule to form an electrical lead 30 for interconnecting one side of the diode with any desired electrical component.

As previously stated, these capsules 14 are normally received from the manufacturer in bulk. As a consequence, one of the first steps in the manufacture of the diodes is to load the various capsules 14 onto a suitable workpiece holder such as the so-called solder boat 16. This loading operation may be accomplished by means of a loading machine such as disclosed and claimed in copending application Serial No. 303,015, entitled "Loading Machine" and filed August 19, 1963 in the name of Sydney Dix and assigned of record to Dix Engineering Co. Alternatively, it may be accomplished by manually positioning each of the capsules 14 on the solder boat 16.

The workpiece holder or solder boat 16 may be of any conventional design. However, in any given assembly line, the holders or solder boat will normally be of a standard or uniform design. By way of example, the solder boat may be similar to the present solder boat 16 and include a center section 32 having a substantially plane surface 34 on the top thereof. A pair of legs 36 are provided at the opposite ends of the section. The legs 36 will be effective to support the center section above any surface upon which the legs 36 rest whereby a clearance space 38 will be provided below the center section 32.

The center section 38 of the boat 16 may include a plurality of holes 40 for receiving the various glass capsules 14. In the present instance these holes 40 include a large portion 42 formed by counterboring through the plane surface 34 and partially through the thickness of the center section 32.

The holes 40 also include a small portion 44 that extends from the bottom of the large portion 42 completely through the center section 32. The small portion 44 is preferably substantially aligned with the axis of the counterbored portion 42 and has an inside diameter that is slightly in excess of the outside diameter of the electrical lead 30. It may thus be seen that the capsules 14 may be seated on the center section 32 with the electrical leads 30 extending downward through the holes 40 and into the clearance space 38 below the center section 32. This will place all of the capsules 14 in vertical positions with their open ends 22 all positioned on top.

The inside diameters of the large portions 42 are preferably only slightly greater than the outside diameters of the glass tubing 18 so as to allow the capsules 14 to fit freely into the large section 42 and seat on the bottom thereof. As will become apparent, it is desirable that the clearance space be sufficiently small to insure all of the capsules 14 being retained in very closely controlled positions. Also, it is desirable that the capsules 14 be retained as nearly vertical as possible.

Although the holes 40 may be arranged in any desired configuration, it is preferable that the capsules 14 on all of the solder boats 16 be arranged in a predetermined standard pattern having a substantially uniform spacing between the capsules 14. By way of example, the present solder boat 16 is arranged to have four parallel rows of holes 40 extending lengthwise of the boat 16 with each row containing twenty-five holes. It will thus be seen that a total of 100 capsules may be loaded onto the center section 32 of the boat 16 so as to be retained in a predetermined fixed relationship relative to each other.

When the glass capsules 14 are all properly seated in the openings 40 they will normally be accurately positioned. All of the capsules 14 will be in substantially vertical positions and the open ends 22 will all be located in a regular pattern. However, under some circumstances one or more of the capsules 14 may be mispositioned so that its open end 22 is sufficiently out of line to interfere with subsequent operations.

In order to overcome the foregoing difficulty, an alignment guide 46 may be provided. This guide 46 consists of a relatively thin plate 48 that has a size and shape substantially identical to the size and shape of the top of the solder boat 16. One or more reference pins 50 are provided on the plate 48 so as to project downwardly therefrom. These pins 50 are adapted to fit into a corresponding number of reference sockets 52 in the top of the solder boat 16. By precisely locating the sockets 52 and pins 50 in standard or reference locations, on all of the solder boats 16 and guides 46, the guides will always be accurately positioned on the boats.

A plurality of alignment apertures 52 may be disposed in the guide 46 in the same pattern as the openings 40 in the solder boat 16. The apertures 52 are positioned so that when the reference pins 50 are seated in the reference sockets 52, each of the apertures 52 will be in alignment with one of the capsules 14. In order to insure that the ends 22 of the capsules 14 will easily fit into the apertures 52 even if there is some initial misalignment, the lower sides of the apertures 52 may be chamfered or tapered 54. Thus, even if one or more of the capsules 14 are tilted or otherwise out of position, when the guide 46 is lowered into position on the solder boat 16 all of the open ends 22 of the capsules 14 will be forced to the exact locations defined by the apertures 52.

Since it is desirable for the glass capsules 14 to remain seated on the solder boat 16 throughout at least a major portion of the diode manufacturing process, the solder boat 16 and the alignment guide 46 should consist of a material which is capable of withstanding all of the treatments to which the capsule will be subjected. Among other things, after the present machine 10 has load pieces 12 of solder into the capsules 14, it will be necessary to heat the capsules 14 to a temperature above the melting point of the solder. Accordingly, the solder boat 16 and guide 46 should be capable of withstanding such elevated temperatures. By way of example, it has been found that the solder boat 16 and alignment guide 46 may be made from a light weight, high temperature aluminum alloy.

After a group of the capsules 14 have been loaded onto the solder boat 16 by hand or by means of a loading machine such as disclosed and claimed in copending application Serial No. 303,015, and the alignment guide 46 has been positioned thereon, the loaded solder boat 16 may be placed within the present loading machine 10 so that pieces 12 of solder may be placed on the glass capsules 14.

The present loading machine 10 is particularly adapted to load a single piece of solder such as the so-called solder preform 12 into each of the capsules 14. A solder preform 12 is a small pellet or disc of solder which fits in the bottom of the capsule 14 in intimate contact with the end 28 of the electrical conductor 26. When the capsule 14 is heated above the melting point of the solder, the solder will form a puddle of liquid solder in the bottom 24 of the capsule 14 and will flow around the exposed short end 28 of the conductor 26. The solder preform 12 may have one or more sides thereof coated with a suitable flux material to assist in the flowing, etc., of the solder. When the solder cools and solidifies, it will be effective to solder a semiconductor wafer to the end 28 of the conductor 26.

In the present instance, the machine 10 for inserting the solder preforms 12 into the capsules 14 includes a housing or cabinet 56, a base 58 disposed adjacent the bottom of the cabinet 56, a tray 60 which is slidably mounted on the base 58 and carries a loaded solder boat 16, and means 62 for forming and feeding the solder preforms 12 into the glass capsules 14 on the solder boat 16.

The base 58 is a solid structure having a pair of downwardly directed legs 64 and a substantially horizontal center section 66. The legs 64 are disposed adjacent the end walls on the opposite ends of the cabinet 56 whereby the center section 66 will extend between the upper ends of the legs 64 and form an open space 68 between the legs 64. An opening may be provided in the middle of the center section 66 so as to permit communication between the space above the center section 66 and the space 68 therebelow.

The table or tray 60 may be provided for moving into and out of the clearance space 68 below the center section 66. In order to permit the tray 60 to be moved into and out of this space 68, a pair of substantially parallel side members 70 may be secured to the legs 64 so as to extend outwardly from the front of the cabinet 56. A suitable track or way such as the grooves 72 may be provided in the side members 70.

The present tray 60 is substantially a plane member having a substantially horizontal surface on the top thereof. A portion of this surface forms a work area 74 for receiving the workpiece holder or solder boat 16. A pair of reference pins 76 may be provided on the tray 60 so as to fit into the reference sockets 78 in the bottom of the solder boat 16 to insure its being very precisely positioned on the work area 74. The opposite edges of the tray 60 may have means thereon for running in the track. More particularly, the tray 60 may have the edges 80 on the opposite sides of the tray shaped to fit into the grooves 72. It may be seen that this arrangement will be effective to allow the tray 60 to move into and out of the space 68 between the legs 64 and under the center section 66. In order to limit the movement of the tray 60, one or more elongated slots 82 may be provided in the tray 60 so as to extend parallel to the side members 70. A stop or pin 84 may project upwardly through the slots 82 so as to engage the ends of the slots. The inner end of the slots 82 are positioned so as to engage the pin 84 when the tray 60 is moved to the extreme outer position substantially as shown in FIGURE 1. When the tray 60 is in the extended position, the work area 74 will be exposed and readily accessible for placing on or removing therefrom a solder boat 16.

The outer end of the slot 82 is positioned so as to engage the pin 84 when the platform 60 has been moved into the loading machine 10 and is in its fully retracted position. When the tray 60 is in this retracted position, the work area 74 thereon will be in substantial alignment with the opening in the center section 66.

The means 62 for forming the solder preforms 12 and feeding them into the capsules 14 is disposed on the base 58 and in the space between the base 58 and the top of the cabinet 56. In the present instance, this means 62 includes a movable support 86 and a pair of coacting punch plates 88 and 90. The support 86 is a solid member that extends substantially the full width of the cabinet 56. The support 86 is slidably disposed on a plurality of vertical guide posts 92 that extend vertically between the base 66 and the top of the cabinet 56 whereby the support 86 may be moved substantially straight up and down.

A plurality of punches 94 are secured to the support 86 so as to project downwardly toward the base 66. These punches 94 are disposed in substantial alignment with the opening through the center section 66. The punches 94 correspond in number to the number of glass capsules 14 to be mounted on the solder boat 16. In addition, each of the punches 94 is positioned in accurate alignment with one of the glass capsules 14 on a solder boat 16 positioned on the tray 60 when the tray 60 has been pushed into its fully retracted position.

The first or upper punch plate 88 is secured to the bottom of the support 86 by means of a plurality of guide rods 96 that depend from the support 86. These rods 96 are retractable into the support 86 to permit the plate 88 to move toward and away from the support 86. A plurality of springs may be disposed on the rods 96 so as to bias the plate 88 downwardly and away from the support 86.

The punch plate 88 includes a plurality of guide passages 98 that extend completely therethrough and are positioned in alignment with the punches 94. The guide passages 98 are just large enough to permit the punches 94 to slide easily therethrough, but are sufficiently small to accurately position and guide the punches 94. Normally, when the springs force the plate 88 down to the bottom of the rods 96, the lower ends 100 of the punches 94 may be disposed just inside of the passages 98 or extend just beyond the bottom of the plate 88. When the punch plate 88 is forced toward the support 86 the lower ends 100 of the punches 94 will be forced outwardly beyond the punch plate 88.

The second or lower punch plate 90 is secured to the base 58 so as to be positioned in or over the opening that is formed in the center section 66. As a consequence, the plate 90 will be located directly over the work area 74 on the tray 60 when the tray 60 is in the retracted position. The plate 90 includes a plurality of guide passages 102 that extend completely through the plate 90. The passages 102 are substantially the same as the passages 98 in the upper punch block 88. That is, they are effective to permit the punches 94 to slide easily therethrough and they are also effective to very accurately position and guide the punches 94 during their travels.

The guide passages 98 and 102 in both the upper and lower punch plates 88 and 90 are very accurately positioned so as to be in direct alignment with each other. As a result, when the support 86 is lowered and the plate 88 engages the plate 90, the ends 100 of the punches 94 will enter into the passages 102 in the lower block 90 and move therethrough.

Suitable positioning means such as a shallow recess may be formed on top of the lower punch plate 90 to receive a solder blank 104 and retain it positioned over the punch passages 102. When the solder blank 104 is in position, as the support 86 descends and forces the punches 94 into lower punch plate 90, the ends 100 of each of the punches 94 will pass through the solder blank 104 and cut a pellet of solder on a so-called solder preform 12 from the blank 104. The diameters of the punches 94 and the thickness of the solder blank 104 are so chosen that the resultant preform 12 will contain the precise amount of solder for the soldering operation. If it is desirable to employ a flux material, a layer of flux may be provided on one or both sides of the blank 104 whereby the solder preforms 12 will contain the desired quantities of flux.

Normally, the support 86 will be retained in an elevated position adjacent the top of the guide posts 92. The springs will be effective to retain the upper punch plate 88 in the extended position away from the support 86. However, there will be a substantial clearance space between the top of the lower punch plate 90 and the bottom of the upper punch plate 88. Thus, while the support 86 is maintained in this raised position, it will be easy to insert or remove the solder blank 104 from the lower punch plate 90. It will also be convenient to slide the tray 60 between its extreme positions whereby the solder boat 16 may be positioned beneath the punches 94 or removed from the loading machine 10 as seen in FIGURE 1.

In order to lower the support 86 and the punches 94 thereon, a suitable drive may be operatively interconnected with the support. Although the drive may be of any desired variety, in the present instance, it includes a pneumatic cylinder 106 and piston. The cylinder 106 in mounted on top of the housing or cabinet 56 in a vertical position with the piston rod extending downwardly through the guide tube. The lower end of the piston rod is connected to the support 86. By feeding compressed air into the upper end of the cylinder 106, the piston will be driven downwardly. This, in turn, will drive the support 86 downwardly along the vertical guides 92. As downward motion of the support 86 progresses, the upper punch plate 88 will come into contact with the top of the lower plate 90 and the top of the solder blank 104. As the downward motion of the support 86 continues, the springs will be compressed and the support 86 will continue to travel toward the punch plate 90. Compression of the springs will be effective to compress the solder blank 104 between the upper and lower punch plates 88 and 90.

As the support 86 approaches the upper punch plate 88, the punches 94 will be driven through the guide passages 98 and extended beyond the bottom of the punch plate 88. Since the springs will compress the punch plate 88 against the solder blank 104, the blank 104 will be compressed flat and held in a fixed position while the punches 94 pass therethrough and cut a plurality of solder pellets or solder preforms 12 from the blank 104. As the lower ends 100 of the punches 94 descend through guide passages 102 in the lower punch plate 90, they will carry the solder preforms 12 through the passages 102. At the lower end of the stroke, lower ends 100 of the punch 94 will have emerged a slight distance from the bottom of the punch plate 90. When in this lowered position, each of the ends 100 of the punches 94 will be in direct alignment with or even extend into the upper end 22 of one of the glass capsules 14. Normally, the solder pellet or preform 12 will fall from the end 100 of the punch 94 and drop into the glass capsule 14. In the event that there is some misalignment and the solder pellet or preform 12 does not drop straight down, the distance is so short the preform 12 will be assured of landing on the tapered surface 108 in the apertures 52 in the guide plate 48. This will be effective to "funnel" all of the falling preforms 12 into the interior of the glass capsules 14.

In order to utilize the present loading machine 10 for loading a plurality of solder pellets or preforms 12 into a plurality of glass capsules 14 for manufacturing glass encapsulated diodes, the glass capsules 14 may first be loaded on a suitable solder boat 16. This loading operation may be accomplished by employing a loading machine similar to that disclosed and claimed in copending application Ser. No. 303,015, or the capsules 14 may be individually loaded by hand onto the solder boat 16.

After the desired number of capsules 14 have been loaded onto the solder boat 16, the alignment guide 46 may be positioned on top of the solder boat 16. The reference pins 76 on the alignment guide 46 will fit into the reference sockets 78 on the corners of the solder boat 16. As a consequence, the alignment guide 46 and the positioning apertures 52 will be precisely located in a predetermined reference relationship.

Normally, the upper or open ends 22 of all of the glass capsules 14 will be in perfect registry with the positioning apertures 52 in the alignment guide 46 as it is placed on the solder boat 16. However, in the event there is some misalignment of some of the capsules 14, the tapered surfaces 54 will be effective to force all of the ends 22 into position as the guide 46 is lowered into position. Once the capsules 14 have been loaded onto the solder boat 16 and the alignment guide 46 has been positioned thereon, the capsules 14 will be positioned with their open ends 22 accurately positioned in the centers of the positioning apertures 52 ready for receiving the solder pellets or preforms 12.

After the foregoing loading and positioning operations are completed, the solder boat 16 may be positioned upon the tray 60. The reference sockets 78 on the solder boat 16 fit over the reference pins 76 on the tray 60. This will be effective to insure the solder boat being accurately retained on the work area 74 in a predetermined reference position. The tray 60 may then be moved along the track 72 until the guide pins 84 engage the ends of the slots 82. At this point, tray 60 will be in the fully retracted position and the solder boat 16 will be disposed immediately below the lower punch plate 90. Preferably, a minimum amount of clearance space 110 will be present between the top of the alignment guide 46 and the bottom of the punch plate 90. Each of the positioning apertures 52 and the open ends 22 of the capsules 14 therein will be disposed in exact alignment with the lower ends of a guide passage 102 in the punch plate 90.

A solder blank 104 may then be mounted on the punch plate 90 so as to cover all of the guide passages 102 in the punch plate 90. The pneumatic cylinder 106 may be energized by feeding compressed air into the top of the cylinder 106. This will force the piston down and drive the support 86 downwardly toward the base. As this motion progresses, the upper punch plate 88 will first strike the lower punch plate 90 and the solder blank 104 positioned thereon. As this motion progresses, the springs will be compressed so as to compress the solder blank 104 and cause the ends 100 of the punches 94 to be extended from the upper punch plate 88. The punches 94 will then be driven through the solder blank 104 and cut a plurality of solder preforms 12 therefrom. The punches 94 and the preforms 12 will then move downwardly through the guide passages 102 in the lower punch plate 90.

When the lower ends 100 of the punches 94 emerge from the bottom of the punch plate 90, the solder pellets 12 will normally fall from the ends 100 and be dropped into the glass capsules 14. Following this, compressed air may be directed into the lower end of the pneumatic cylinder 106 so as to lift the support 86 and upper punch plate 88 upwardly clear of the lower punch plate 90. The punches 94 will then be withdrawn completely from the lower punch plate 90 and from the solder blank 104. Normally, at this point all of the capsules 14 will have a solder pellet or preform 12 therein. However, under some circumstances it has been found that occasionally a solder pellet 12 will temporarily adhere to the lower end 100 of a punch 94. Accordingly, it has been found desirable to again energize the cylinder 106 so as to drive the punches 94 violently downwardly and rapidly return them to the raised position. Any pellet 12 which may have originally adhered to the punches 94 will thereby be shaken loose and dropped into the capsules 14.

After all of the capsules 14 have ben loaded with the solder preforms 12, the tray 60 may be moved into the extended position similar to that seen in FIGURE 1 and the solder boat 16 removed therefrom. A semiconductor wafer may then be inserted into each of the glass capsules 14 so that the wafer will be seated on top of the solder preform 12. Following this, a weight plate such as disclosed and claimed in copending application Serial No. 302,931 entitled, "Soldering Means," and filed August 19, 1963, in the name of Sydney Dix and assigned of record to Dix Engineering Co., may be placed on the solder boat so as to bias the semiconductive wafers and solder preforms into position. The loaded solder boat 16 and weight plate may then be placed in a suitable furnace and heated until the solder preform 12 forms a pool of liquid solder at the lower end 24 of the capsule 14. This pool will be disposed around the exposed end 28 of the conductor 26 and the semiconductive wafer will float on top. The boat 16, capsules 14, solder 12 and wafer may then be removed from the furnace and allowed to cool to room temperature. The pool of solder will then solidify and cause the wafer to be soldered onto the conductor 26.

It may thus be seen that a novel loading machine 10 has been provided whereby a large number of glass diode capsules 14 may be loaded with solder preforms 12 in a very short interval of time. The only amount of manual labor that is required is that necessary to place the solder boat 16 on the tray 60 and to remove the boat 16 with the loaded capsules 14 from the tray 60. In addition, it is no longer necessary to buy stock and handle expensive solder preforms 12 as they cannot be very rapidly formed from inexpensive sheets of solder blanks 104 at the time the loading operation is performed.

While only a single embodiment of the present invention is disclosed and described herein, it will be readily apparent to persons skilled in the art that numerous changes and modifications may be made without departing from the scope of the invention. Accordingly, the foregoing disclosure and description thereof are for illustrative purposes only and do not in any way limit the invention which is defined only by the claims which follow.

What is claimed is:

1. A machine for loading a member into each of the workpieces in a group of workpieces, said machine including:
 a workpiece holder having a plurality of positioning means for receiving said workpieces and retaining them in longitudinal columns and transverse rows, said positioning means being effective to position each of the workpieces so that they all have upwardly directed openings,
 punch means including a separate punch for each of the workpieces in said group, said punches being arrange in a plurality of columns and rows and positioned substantially identical to the columns and rows of said workpieces, means having said workpiece holder disposed thereon for moving said workpiece holder into a position wherein the openings in each of said workpieces is disposed in substantial alignment with said punches, means for positioning a blank in said punch means in substantial alignment with the open ends of said workpieces for being pierced by said punches, and drive means interconnected with said punch means and effective to force said punches through said blank to cut said members from said blank and to force said members through said open ends and into said workpieces.

2. A machine for loading a member into each of the glass capsules in a group of glass capsules mounted on a workpiece holder, comprising the combination of:

punch means including a separate punch for each of the capsules, each of said punches being arranged to be disposed in substantial alignment with said capsules, means for receiving said workpiece holder and retaining it in a position wherein each of the capsules in said group is aligned with one of said punches, means for positioning a blank in said punch means over said workpiece holder for being pierced by said punches to cut a plurality of said members from said blank, and means for actuating said punch means and forcing said individual punches through said blank and forcing the resultant members into said glass capsules.

3. A machine for loading a member into each of the glass capsules in a group of glass capsules mounted on a workpiece holder in a plurality of longitudinal columns and transverse rows, comprising the combination of:

punch means including a separate punch for each of the capsules, said punches being arranged in a plurality of columns and rows and being positioned substantially identical to the columns and rows of said capsules, means for receiving said workpiece holder and retaining it in a position wherein each of the capsules in said group is aligned with one of said punches, means for positioning a blank in said punch means over said workpiece holder for being pierced by said punches to cut a plurality of said members from said blank, means for actuating said punch means and forcing said individual punches through said blank to cut said members from said blank, and guide means mounted on said workpiece holder and disposed in alignment with said punches and said capsules for receiving said members and guiding them into the glass capsules.

4. A machine for loading individual pieces of solder into each of the glass capsules in a group of glass capsules mounted on a workpiece holder, comprising the combination of:

punch means including a separate punch for each of the capsules, each of said punches being positioned to be aligned with one of the glass capsules on said workpiece holder, means for receiving said workpiece holder and positioning it with each of the capsules in said group aligned with one of said punches, means for positioning a solder blank in said punch means and in substantial alignment with said glass capsules, and means for forcing each of said punches through said solder blank to cut said solder pieces therefrom and force them into said capsules.

5. A machine for loading individual pieces of solder into each of the glass capsules in a group of glass capsules mounted on a workpiece holder in a plurality of longitudinal columns and transverse rows, comprising the combination of:

punch means including a separate punch for each of the capsules, said punches being arranged in a plurality of columns and rows, each of the punches in said columns and rows being positioned in substantial alignment with one of the glass capsules on said workpiece holder, means for receiving said workpiece holder and retaining it positioned with each of the capsules in said group aligned with one of said punches, a plurality of separate guides disposed between said punch means and said workpiece holder, each of said guides being disposed in substantial alignment with one of said punches and one of the glass capsules on said workpiece holder, means for positioning a solder blank over said guides and in said punch means for being pierced by said punches to cut a plurality of said pieces from said solder blank, and drive means for forcing each of said punches through said solder blank to cut said solder pieces from said blank and force them through said guides and into said capsules.

6. Means for loading individual pieces of solder into each of the glass capsules in a group of glass capsules for encapsulating diodes, said means including the combination of:

a workpiece holder having a plurality of positioning means for receiving said capsules and retaining them in predetermined positions, punch means having a separate punch for each capsule in said group, said punches being arranged substantially identical to the positioning means on said workpiece holder, transfer means for receiving said workpiece holder, said transfer means being movable between a retracted position and an extended position, said transfer means when in said retracted position being effective to align each of the glass capsules on said workpiece holder with one of said punches, means for positioning a solder blank in said punch means for being pierced by said punches to thereby cut said pieces of solder from said blank, and means for forcing said punches through said blank to cut a plurality of solder pieces from said blank and force them through said ends of said glass capsules.

7. Means for loading individual pieces of solder into each of the glass capsules in a group of glass capsules for encapsulating diodes, said means including the combination of:

a workpiece holder having positioning means for retaining said capsules seated thereon with their open ends directed upwardly and arranged in a predetermined array, a guide plate mounted on said holder and having a plurality of apertures arranged in substantially the same array for alignment with said open ends, punch means having separate punches disposed in substantial alignment with said apertures for moving therethrough, transfer means for receiving said workpiece holder and movable between a retracted position and an extended position, said transfer means when in said retracted position being effective to align each of the open ends of the glass capsules on said workpiece holder with the apertures in said guide plate, means for positioning a solder blank on said guide plate in alignment with said apertures for being pierced by said punches to have pieces of solder cut therefrom, and means for forcing said punches through said blank and said apertures to cut of plurality of solder pieces from said blank and forcing them through said apertures and into the open ends of said glass capsules.

8. Means for loading individual pieces of solder into each of the glass capsules in a group of glass capsules for encapsulating diodes, said means including the combination of:

a workpiece holder having positioning means for retaining said capsules seated thereon with their open ends directed upwardly and arranged in a predetermined array, first reference means on said workpiece holder disposed in a predetermined location on said holder, a guide plate mounted on said holder and having a plurality of apertures arranged in substantially the same array for alignment with said open ends to retain them in said array, punch means having a separate punch for each capsule in said group, said punches being disposed in substantial alignment with said apertures for moving therethrough, transfer means for receiving said workpiece holder and being movable between a retracted position and an extended position, reference means on said transfer means for coacting with the first reference means to align the open ends of said capsules with the passages in said punch plate when said transfer means is in said retracted position, a punch plate having a plurality of passages disposed in alignment with each of said punches and with said glass capsules when said transfer means is disposed in said retracted position, means for positioning a solder blank on said punch plate for being pierced by said punches, and drive means for forcing said punches through said blank and into said passages to thereby cut a plurality of solder pieces from said blank and force them through said passages and into the open ends of said glass capsules.

9. A machine for loading a separate piece of solder into the open ends of the glass capsules in a group of glass capsules mounted on a workpiece holder in a predetermined array, said machine comprising the combination of:

a lower punch plate having guide passages extending therethrough and arranged in said array, an upper punch plate disposed above said lower punch plate, said upper punch plate having guide passages extending therethrough and arranged in said array and aligned with the guide passages in said lower plate, punch means disposed above said punch plates and including a plurality of punches slidably disposed in the guide passages in said upper punch plate, transfer means movable between a retracted position and an extended position, positioning means on said transfer means for receiving said workpiece holder, said positioning means being effective when said transfer means is in the retracted position to align said open ends of said capsules with the guide passages in said lower punch plate, said positioning means being effective when said transfer means is in an extended position to retain said workpiece holder in an accessible position remote from said punches, means on said lower punch plate for positioning a solder blank thereon in substantial alignment with said guide passages and said punches, and drive means for forcing said upper punch plate down onto said lower plate to compress said blank therebetween and to force said punches through said guide passages and said solder blank to cut a plurality of pieces of solder from said blank, said punches being effective to force said pieces of solder through the lower guide passages and into and through the open ends of said capsules.

10. Means for loading individual pieces of solder into the open ends of the glass capsules in a group of glass capsules for encapsulating diodes, said means including the combination of:

a workpiece holder having mounting means for retaining said capsules seated thereon with their open ends directed upwardly and arranged in a predetermined array, a guide plate mounted on said holder and having a plurality of apertures arranged therein for receiving said open ends and retaining them disposed in said array, a lower punch plate having guide passages extending therethrough and arranged in said array, an upper punch plate disposed above said lower punch plate, said upper punch plate having guide passages extending therethrough and arranged in said array and aligned with the guide passages in said lower plate.

punch means having a separate punch slidably disposed in each of the passages in said upper punch plate, transfer means for receiving said workpiece holder and being movable between a retracted position and an extended position, said transfer means when in said retracted position being effective to align each of the open ends of the glass capsules on said workpiece holder with the passages in the lower punch plate, means for positioning a solder blank on said lower plate in alignment with said guide passages for being pierced by said punches to thereby cut said pieces of solder from said blank, and drive means for forcing said upper punch plate against said solder blank to compress it against said lower punch plate and force punches through said blank to cut said plurality of solder pieces therefrom and force them through said guide passages and into the open ends of said glass capsules.

References Cited by the Examiner

UNITED STATES PATENTS

| | | | |
|---|---|---|---|
| 414,288 | 11/1889 | Carpenter | 83—619 X |
| 776,476 | 11/1904 | Logan | 83—167 X |
| 1,827,133 | 10/1931 | Becker | 83—133 X |
| 2,279,420 | 4/1942 | Thum | 83—167 X |
| 2,454,316 | 11/1948 | Haecks | 83—167 X |
| 2,466,291 | 4/1949 | Williams | 83—133 |

WILLIAM S. LAWSON, *Examiner.*

WILLIAM W. DYER, Jr., *Primary Examiner.*